United States Patent

Moreau et al.

[11] Patent Number: 6,047,663
[45] Date of Patent: Apr. 11, 2000

[54] MODULAR FLOORING SYSTEM FOR AN ANIMAL HOUSING

[76] Inventors: Pierre A. Moreau, 1422 Scotland St. SW., Calgary, Alberta, Canada, T3C 2L4; W. James Real, 313 Woodbriar Place SW., Calgary, Alberta, Canada, T2W 6A9

[21] Appl. No.: 09/038,840

[22] Filed: Mar. 12, 1998

[51] Int. Cl.[7] .................................................. A01K 1/00
[52] U.S. Cl. ........................................... 119/529; 119/526
[58] Field of Search ..................................... 119/529, 526, 119/527, 528, 450

[56] References Cited

U.S. PATENT DOCUMENTS

| | | |
|---|---|---|
| Re. 28,834 | 6/1976 | Johnson . |
| 229,436 | 6/1880 | Mallett, Jr. . |
| 3,995,593 | 12/1976 | Bowser .................................. 119/529 |
| 4,048,960 | 9/1977 | Barnidge et al. ....................... 119/529 |
| 4,176,622 | 12/1979 | Wolf . |
| 5,351,458 | 10/1994 | Lehe ...................................... 52/586.2 |
| 5,456,209 | 10/1995 | Heinrich ................................. 119/450 |
| 5,687,534 | 11/1997 | Kongsgaard et al. ................... 52/664 |
| 5,862,779 | 1/1999 | Kleinsasser ............................. 119/529 |

FOREIGN PATENT DOCUMENTS

| | | | |
|---|---|---|---|
| 1108487 | 10/1929 | Canada | ................................... 119/33 |
| 1222170 | 3/1984 | Canada | ................................... 119/33 |
| 2021914 | 7/1990 | Canada | ................................... 119/33 |
| 2065122 | 4/1992 | Canada . | |
| 2135640 | 5/1993 | Canada . | |
| 2142284 | 8/1993 | Canada . | |
| 2106614 | 9/1993 | Canada . | |
| WO96/13152 | 10/1994 | WIPO . | |

OTHER PUBLICATIONS

"Filter–Eeze Excelerator", brochure, b BCM Manufacturing Ltd. (undated).
"Valu–Cost", brochure, by BCM Manufacturing, Ltd. (undated).
"Ikadan Ultraflex", brochure, by Ikadan System A/S (undated).
"Polygrate", brochure, by Faroex Ltd. (undated).
"Polygrate Gro–More", brochure, by Faroex Ltd. (undated).

Primary Examiner—Peter M. Poon
Assistant Examiner—Yvonne Abbott
Attorney, Agent, or Firm—Lynn S. Cassan

[57] ABSTRACT

A modular flooring system for an animal housing is provided, the flooring being particularly suited to pig housings due to the structure of the flooring which minimizes spacings in which manure, and its attendant bacteria, could collect. A plurality of interconnecting interior and straight-edge panels are provided and a plurality of panel support units each unit comprising a device for fixing the unit to a substrate of the housing and a device for engaging at least one panel to support the panel over the substrate. The panels each have a rectangular frame having side, top and bottom members and a plurality of spaced horizontal and vertical members extending between the side and top and bottom members of the frame, respectively, forming a plurality of horizontal slots. Each side member comprises means for coupling the panel to an adjacent panel. In the interior panels the outer configurations of the top and bottom members are mirror images and the interior panels are rotatable. In the straight-edge panels the top members thereof are smooth and provide a straight-edge for abutment with a wall of the housing. The top and bottom members of the interior panels and bottom members of the straight-edge panels each comprise a plurality of horizontally extending extension members spaced over the length thereof. The coupling member of the panels couples horizontally adjacent panels and the extension members of vertically adjacent panels matingly interconnect.

11 Claims, 17 Drawing Sheets

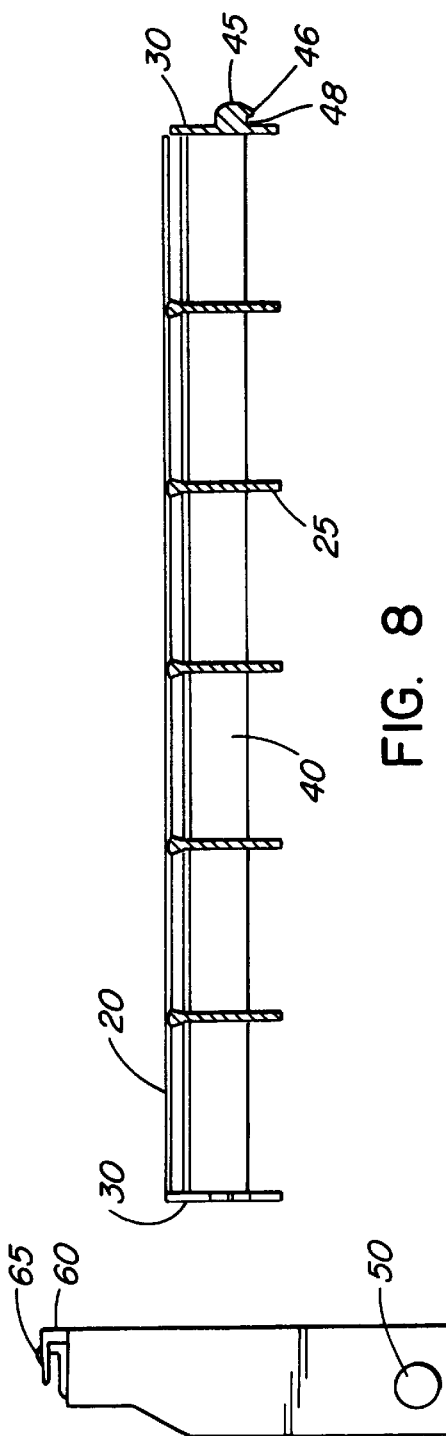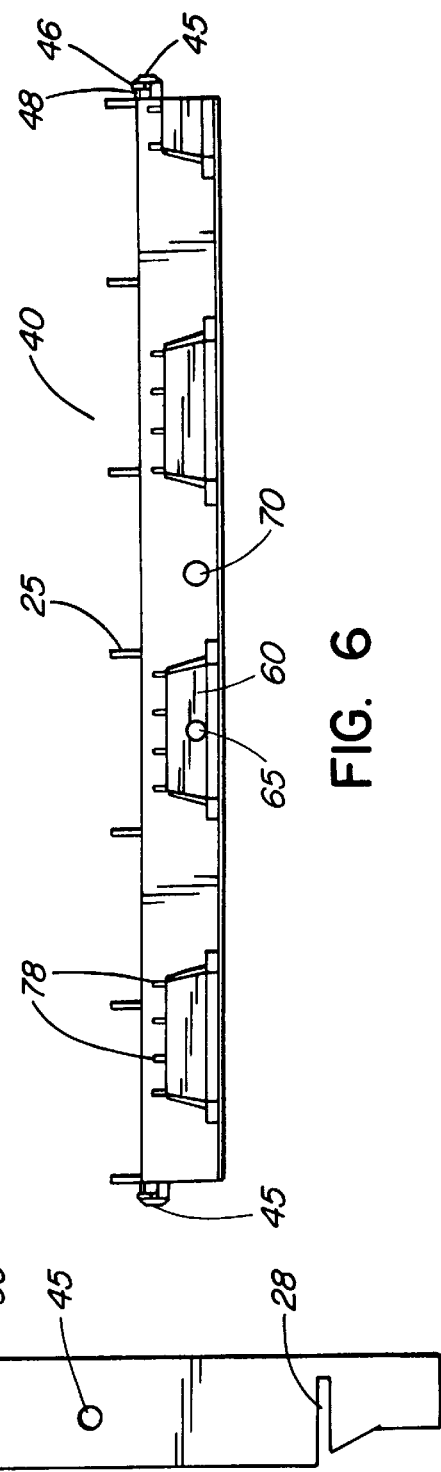

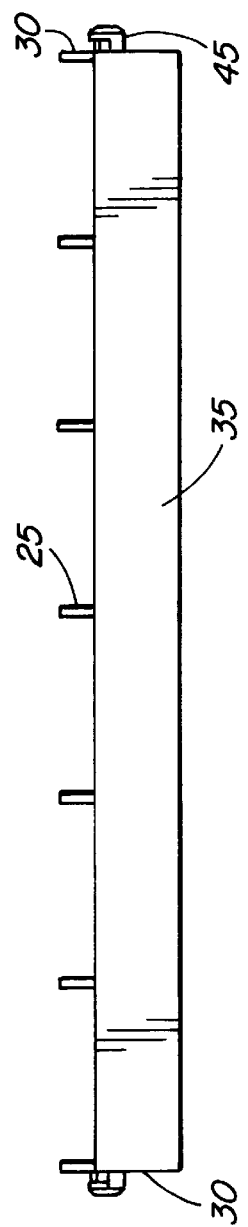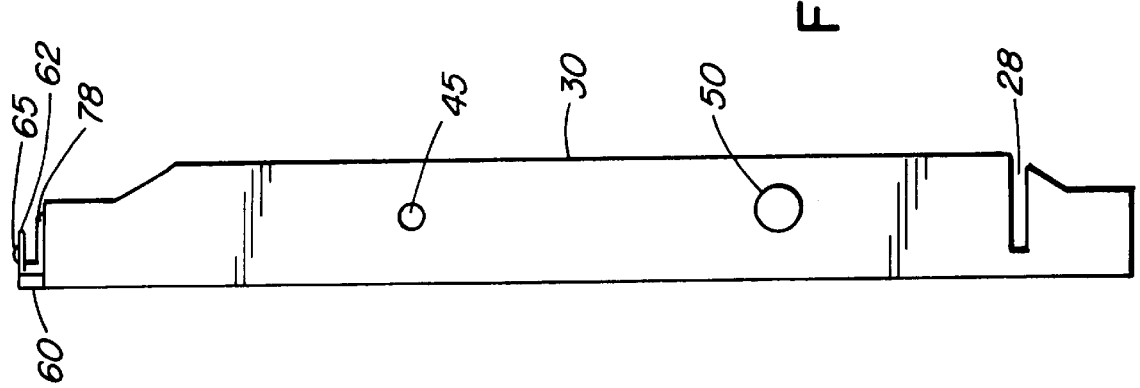

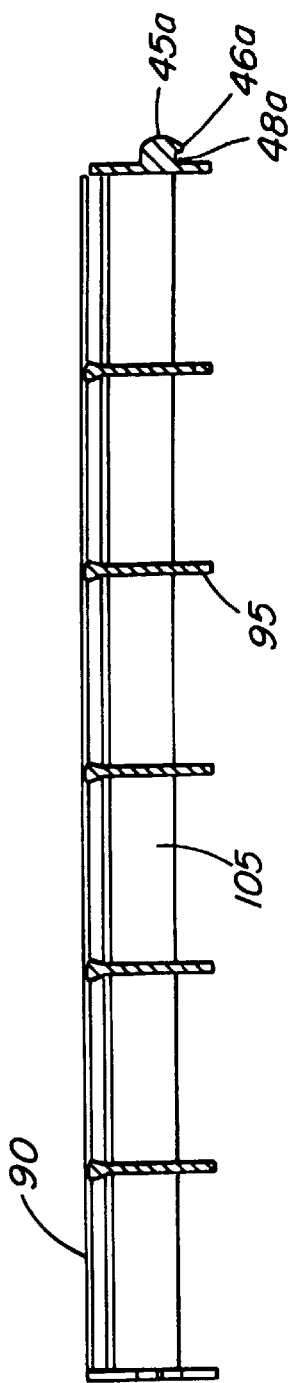
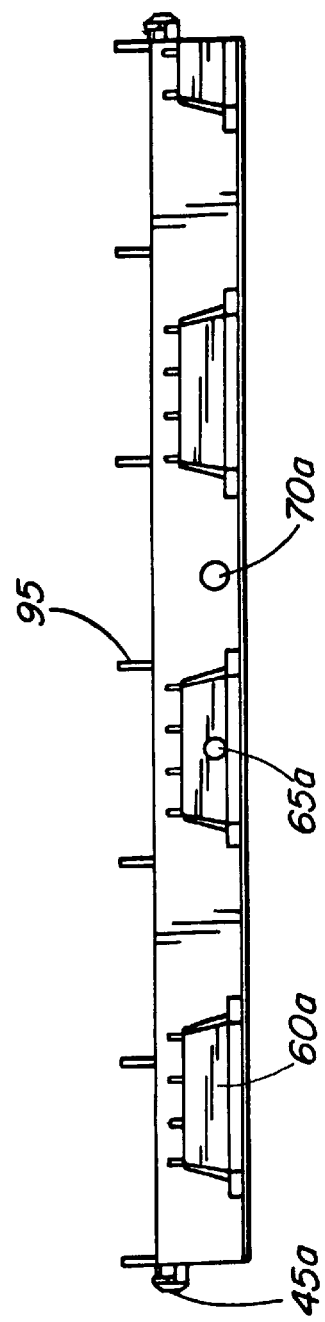
FIG. 16
FIG. 15

MODULAR FLOORING SYSTEM FOR AN ANIMAL HOUSING

FIELD OF THE INVENTION

The invention is in the field of flooring for an animal housing and, in particular, to a modular flooring system for pigs.

BACKGROUND

The cleanliness of a housing in which pigs are raised is critical because young pigs are highly vulnerable to disease caused by bacteria. Consequently, the flooring used for pig housings must be configured for easy and thorough cleaning and should also be easy to assemble and disassemble. In addition, the flooring must be configured with slots so that manure passes through the flooring and away from the young pigs without getting caught in cracks or on rough or irregular surfaces of the flooring. Such flooring is cleaned using a pressurized hose which washes off not only the top of the flooring but also the area below the flooring.

Modular flooring systems available to date provide only uniform interconnecting panels in which one configuration of panel is used for the complete flooring. The panels of such systems may be installed in one orientation only. The disadvantage of these systems is that such panels cannot be installed in a rotated orientation and this means that when such panels are installed in an area having dimensions requiring only a portion of a panel the unused portion of such panel is discarded. A further disadvantage associated with such systems is that the panels of such systems do not closely abut the walls of the building or room which is to house the pigs but instead leave openings along the sides of the walls which will plug up with manure and provide a setting for the growth of harmful bacteria. For some such systems left and right hand side insert pieces are sometimes provided to fit into these openings but they often do not fit snuggly, or may pop out, and thereby still leave openings in which manure can collect.

Therefore, there is a need in the pig farming industry for a modular flooring system which can be installed in areas of various dimensions without wasting large portions of panels and in which the end panels smoothly abut the walls of the building or room in which the flooring is installed without leaving spaces between the wall and the flooring.

SUMMARY OF THE INVENTION

In accordance with the present invention there is provided a modular flooring apparatus for an animal housing having walls and a substrate. A plurality of interior flooring panels each comprise a rectangular frame and a plurality of spaced horizontal and vertical members extending between side and top and bottom members of said frame, respectively, forming a plurality of horizontal slots. The side members may be configured as mirror images of each other and the top and bottom members may also be configured as mirror images. Each side member comprises means for coupling the panel to an adjacent like panel. In the preferred embodiment the coupling means is provided by a locking arm extending from the interior face of the side member and an aperture spaced from the locking arm through the interior of the side member. The top and bottom members each comprise a plurality of spaced horizontally extending extension members over the length thereof.

A plurality of straight-edge flooring panels each comprise a rectangular frame having the same outer dimensions as the frame of the interior flooring panel. A plurality of spaced horizontal and vertical members extend between side and top and bottom members of said frame, respectively, forming a plurality of horizontal slots. As for the interior panel each side member comprises coupling means which preferably comprises a locking arm extending from the interior face of the side member and an aperture spaced from the locking arm through the interior of the side member. The bottom member comprises a plurality of spaced horizontally extending extension members over the length thereof. The top member is generally smooth and provides a straight-edge for abutment with a wall of the housing.

A plurality of panel support units each comprise means for fixing the unit to a substrate of the housing and means for engaging at least one panel to support the panel over the substrate. The coupling means of the side members of the panels couple horizontally adjacent panels whereby, in the preferred embodiment, the locking arms engage the apertures of horizontally adjacent panels. The extension members of vertically adjacent panels matingly interconnect. The interior panels are fully rotatable for coupling to an adjacent panel such that either side member of such panel may be coupled to a horizontally adjacent panel and either of said top and bottom members may be coupled to a vertically adjacent panel.

Preferably, the locking arm of both panels comprises a downwardly extending lip at the end thereof and a channel between the end of the arm and the lip whereby the channel of a locking arm of a first panel engages the wall of a side member of an adjacent panel, and resists upward movement of the adjacent panel relative to the first panel, when the locking arm of the first panel has passed through and engaged with the aperture of the adjacent panel. Preferably, vertically adjacent panels snap-fit together by means of a depression located in the interior face of each of the bottom members of the panels and each of the top members of the interior panels and apart from the extension members, and a plug extending from one of the extension members on each of the bottom members of the panels and each of the top members of the interior panels, whereby the plug is configured to fit into the depression of an adjacent flooring panel. The plug and depression may be semi-spherical. The extension members preferably comprise a smooth top surface whereby the top surface of the area surrounding the interconnecting edges of adjacent vertical panels is smooth, continuous and without any significant space between those edges. Preferably, the horizontal members of the panels are generally triangular in cross-section and the panels are comprised of thermoplastic.

BRIEF DESCRIPTION OF THE DRAWINGS

The invention is described in detail in the following with reference to the following drawings which illustrate a preferred embodiment of the invention. Each reference numeral in the drawings pertains throughout to a like element and the designation "a" following a reference numeral identifies a like element associated with a different component.

FIG. 4 is a right side view of the panel of FIG. 1;

FIG. 5 is a left side view of the panel of FIG. 1, the l eft and right side members being mirror images;

FIG. 6 is a front view of the panel of FIG. 1 being the bottom member of the panel;

FIG. 7 is a back view of the panel of FIG. 1 being the top straight-edge member of the panel;

FIG. 8 is a sectional view as seen from section AA of FIG. 3;

FIG. 15 is a front view of the panel of FIG. 10, the back view thereof (not shown) being identical to the front view;

FIG. 16 is a sectional view as seen from section AA—AA of FIG. 12;

DETAILED DESCRIPTION OF A PREFERRED EMBODIMENT

Figure 1:
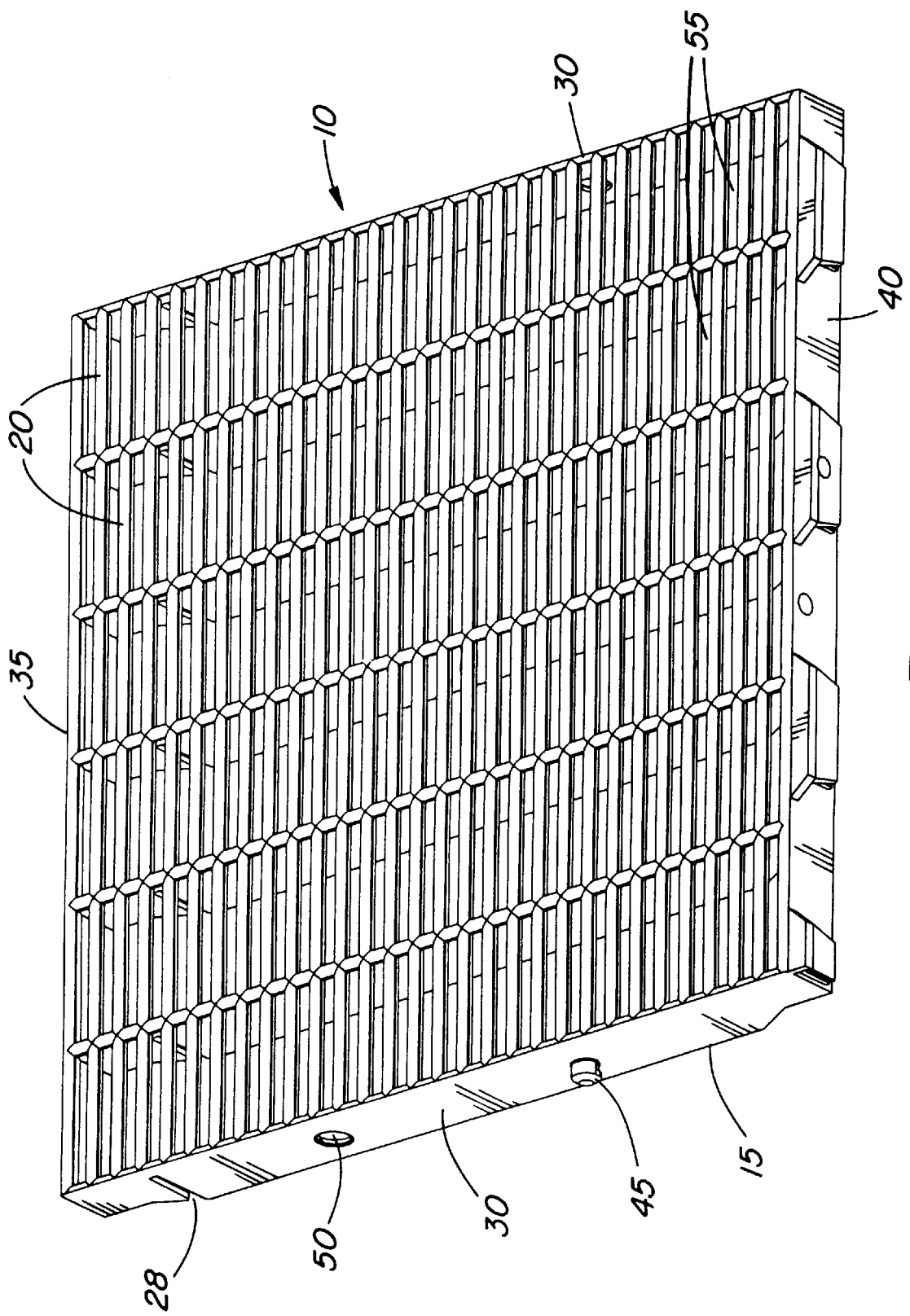
FIG. 1 is a perspective top view of a straight-edge flooring panel in accordance with the invention.
Figure 2:
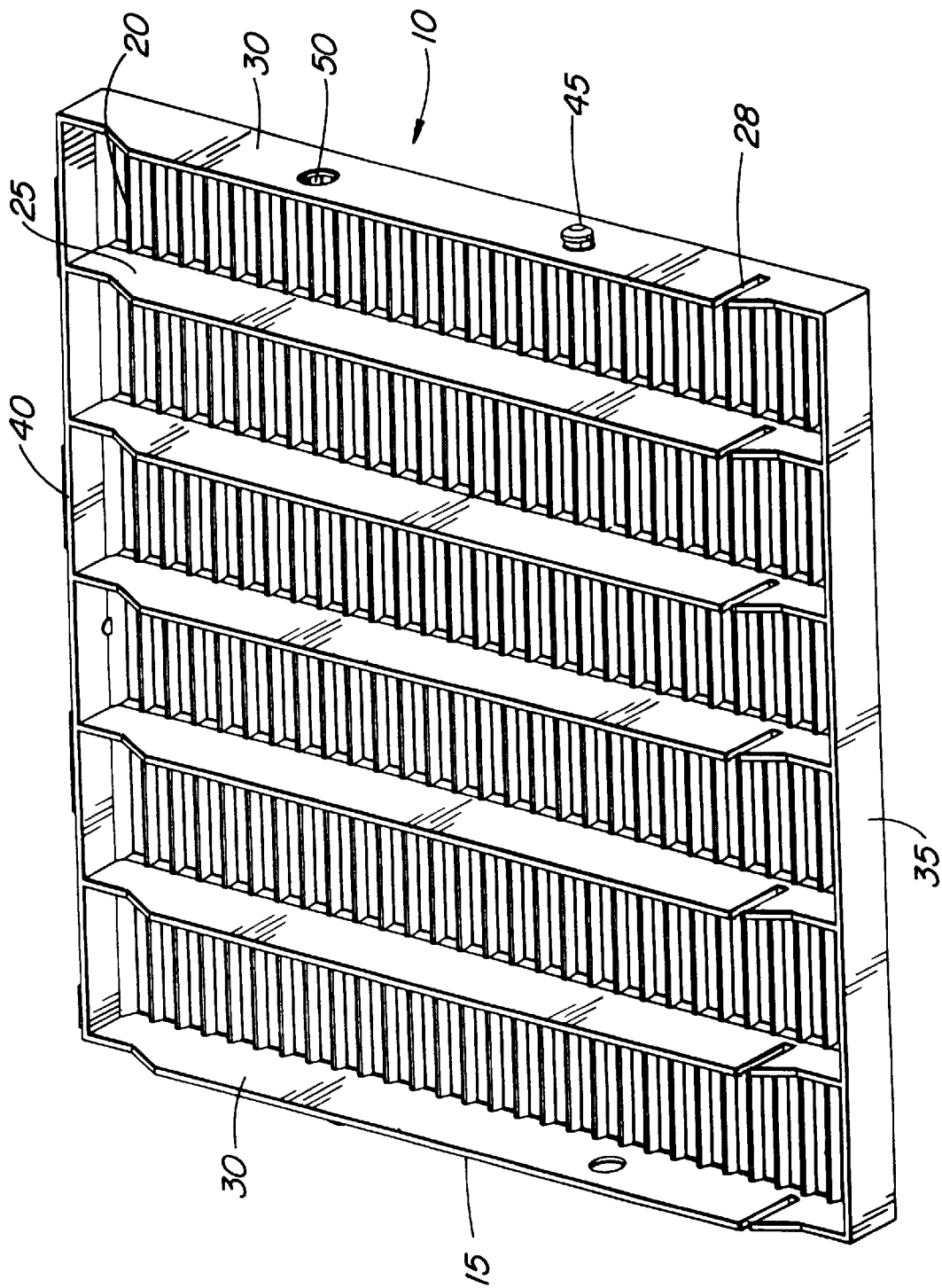
FIG. 2 is a perspective bottom view of the panel of FIG. 1.

FIG. 1 of the drawings shows a perspective top view of the preferred straight-edge flooring panel 10 of the invention. FIG. 2 shows a perspective bottom view of this panel 10. A rectangular frame 15 (the term rectangular herein being defined to mean a shape having four sides with opposite sides generally parallel and right angles between adjacent sides and including a square as one such shape) includes two side members 30, a top member 35 and a bottom member 40. Horizontal members 20, having a triangular cross-section, extend between the side members 30. Vertical members 25 extend between the top and bottom members 35,40, the vertical members 25 and side members 30 having corresponding shapes. Horizontal slots 55 are defined by the intersection of the horizontal and vertical members 20,25. These slots are sized to provide to the flooring, when installed, a 48 percentile of openings (i.e. 48% of the total flooring is open). This large percentile of openings improves the ease by which the flooring may cleaned, and the effectiveness of the cleaning, after the flooring has been installed and is in use because there are very few, if any, areas of the flooring or substrate therebelow which are hidden from view or from the action of the cleaning hose.

Figure 3:
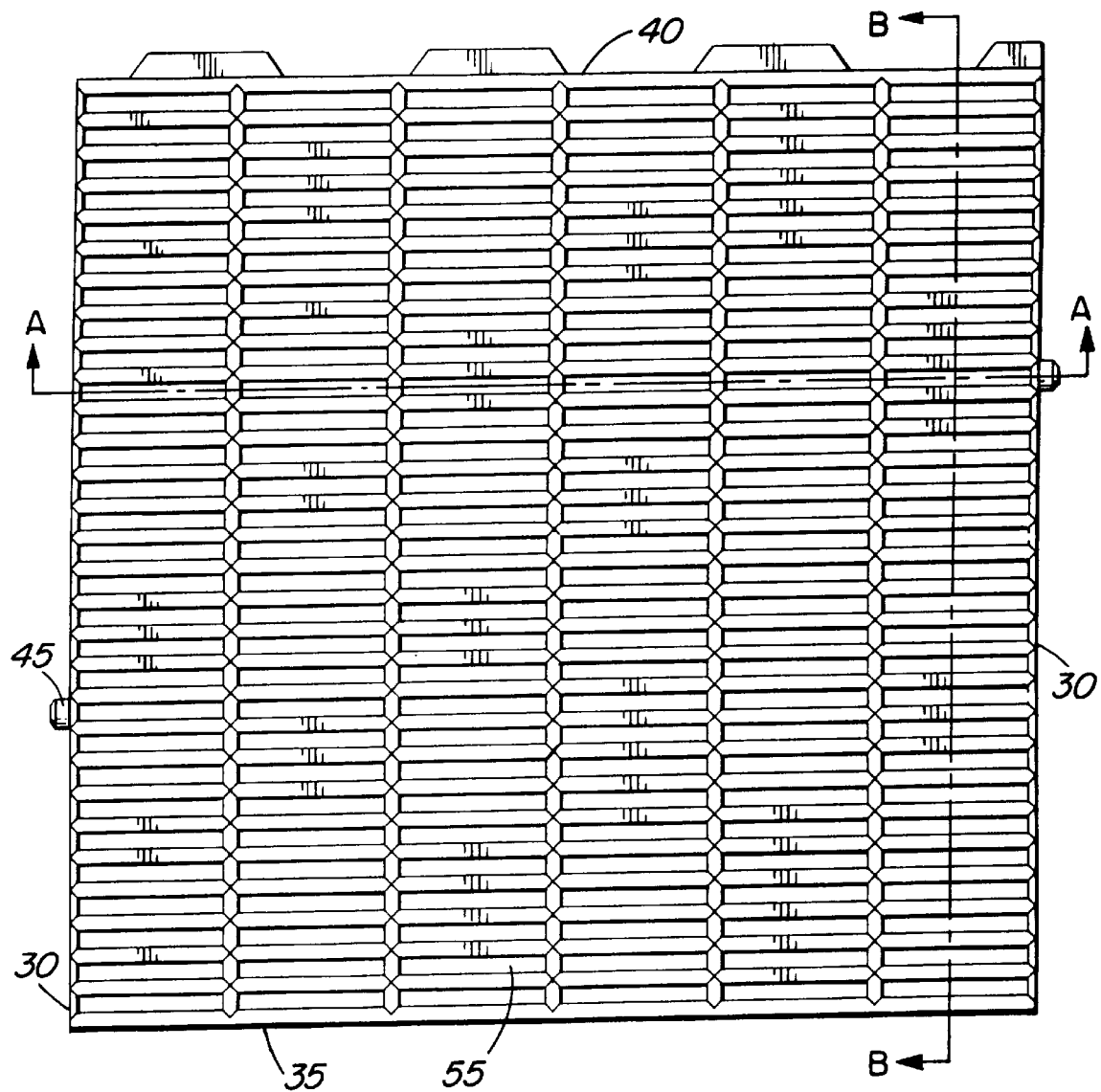
FIG. 3 is a top view of the panel of FIG. 1 oriented such that the top straight-edge member appears at the bottom.
Figure 9:
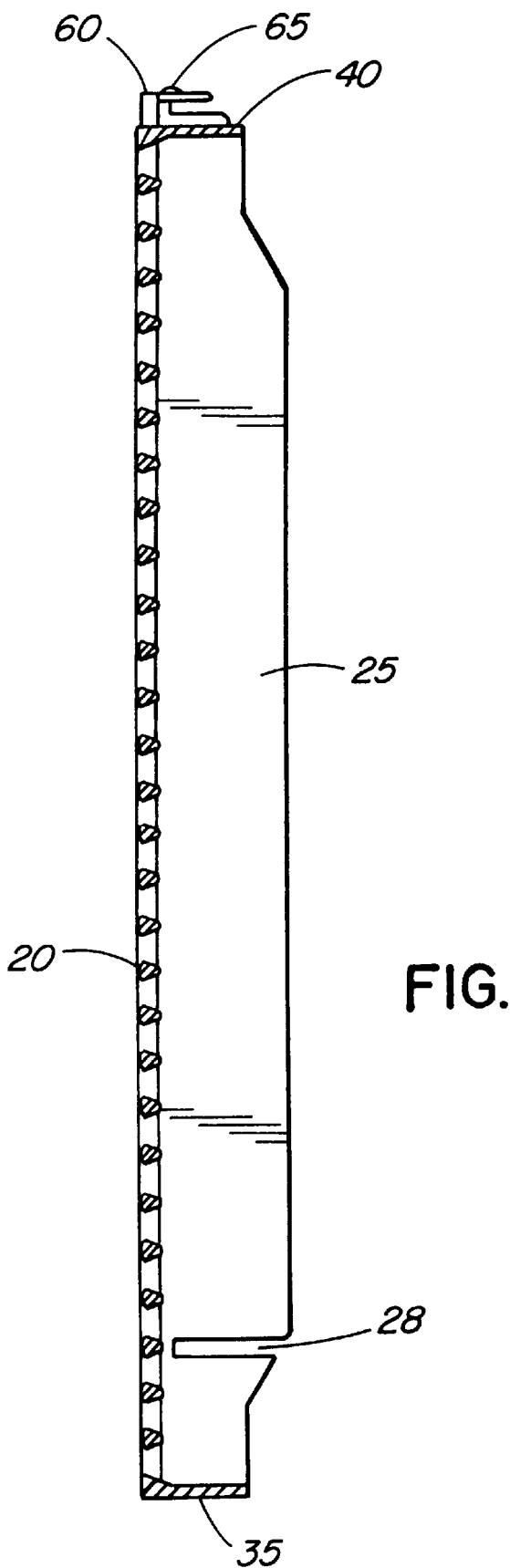
FIG. 9 is a sectional view as seen from section BB of FIG. 3.

FIG. 3 shows the top view of the straight-edge panel 10. FIGS. 4 and 5 show the left hand side and right hand side views, resp., of the panel of FIG. 3. FIGS. 6 and 7 show the top and bottom views, resp., of the panel of FIG. 3. FIG. 8 shows a cross-sectional view of FIG. 3 taken at section AA and FIG. 9 shows a cross-sectional view of FIG. 3 taken at section BB. The top member 35 is generally smooth and provides a straight-edge for abutment with a wall of the housing in which the flooring is installed. The side members 30 each include means for coupling together, horizontally, adjacent panels. The coupling means may be any male/female- or interlock- type of connector which is suitable for establishing mirror image side members.

In the preferred embodiment each side member 30 comprises a locking arm 45 and an aperture 50, the configuration of the side members 30 being mirror images of each other relative to the vertical center line of the panel. A lip 46 extends from the end of the locking arm 45 forming a channel 48 between the end of the arm 45 and the lip 46. The channel 48 engages the wall of the side member 30 of an adjacent panel and resists upward movement of the adjacent panel relative thereto when the locking arm 45 has passed through and engaged with the aperture 50 of the adjacent panel.

Figure 24:
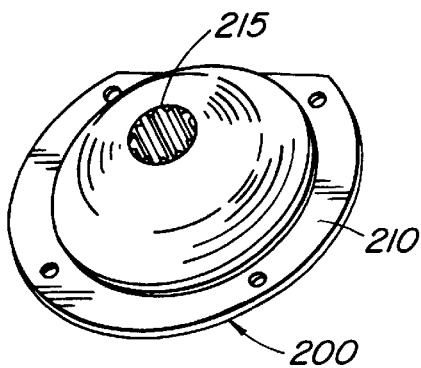
FIG. 24 is a top perspective view of a bottom member of a support unit.
Figure 25:
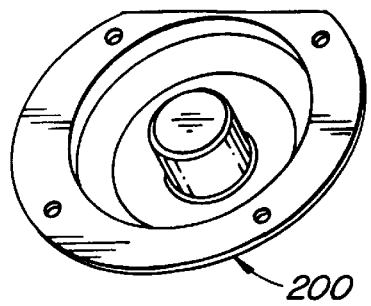
FIG. 25 is a bottom perspective view of the bottom member of FIG. 24.
Figure 26:
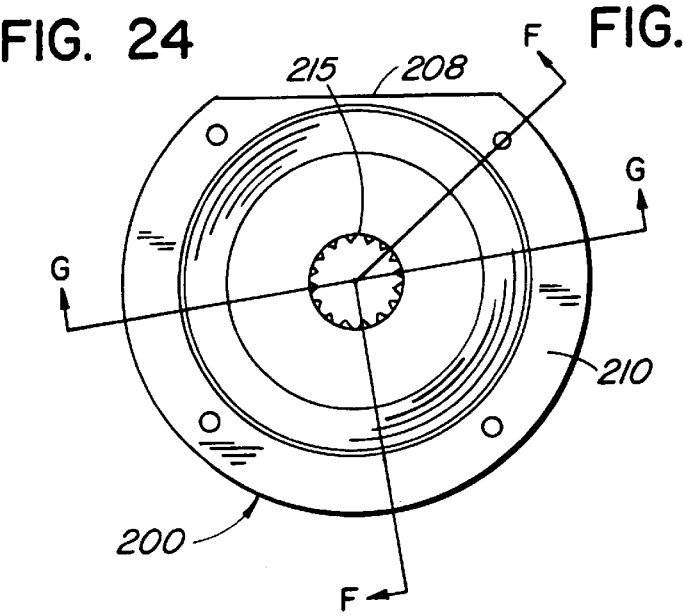
FIG. 26 is a top view of the bottom member of FIG. 24.
Figure 27:
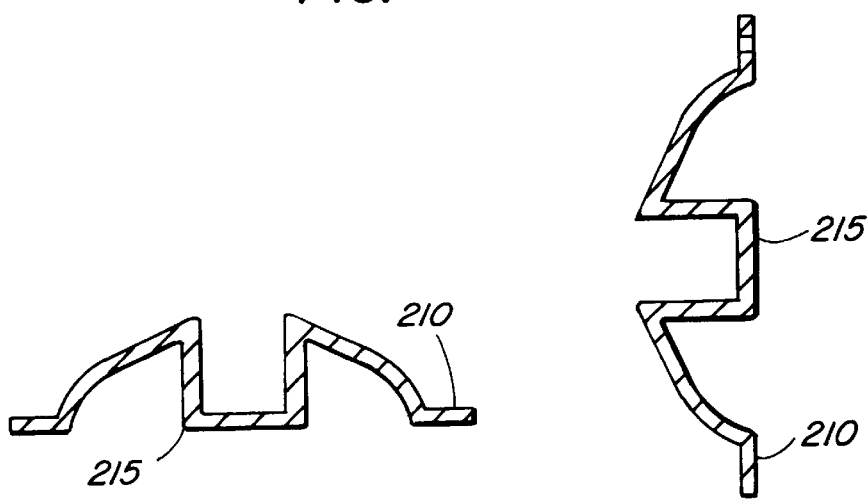
FIG. 27 is a sectional view of the bottom member of FIG. 26 as seen from section GG.
Figure 28:
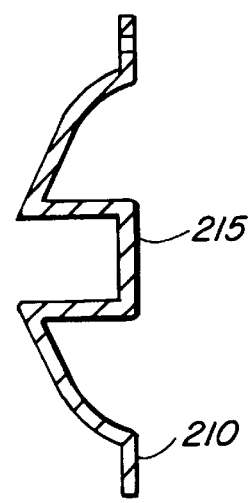
FIG. 28 is a sectional view of the bottom member of FIG. 26 as seen from section FF.
Figure 29:
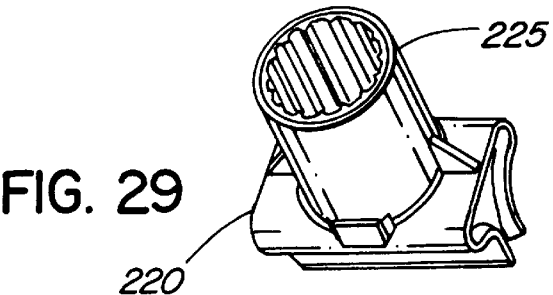
FIG. 29 is a bottom perspective view of a top member of a support unit.
Figure 30:
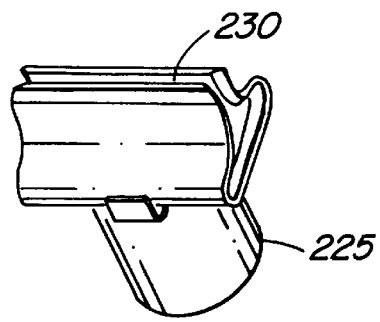
FIG. 30 is a top perspective view of the top member of FIG. 29.
Figure 32:
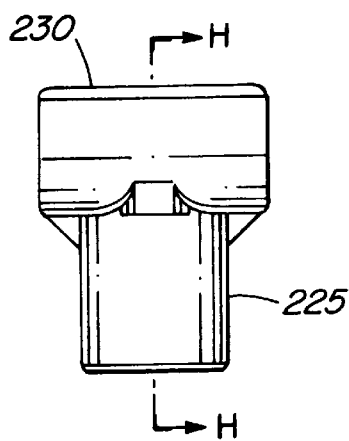
FIG. 32 is a side view of the top member of FIG. 30.
Figure 31:
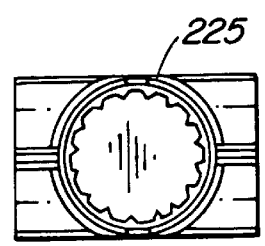
FIG. 31 is a bottom view of the top member of FIG. 30.
Figure 34:
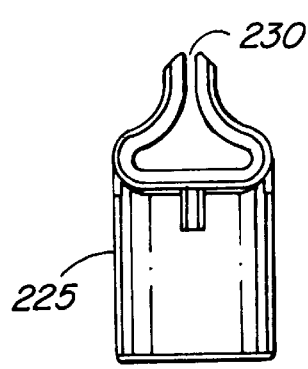
FIG. 34 is an end view of the top member of FIG. 30.
Figure 33:
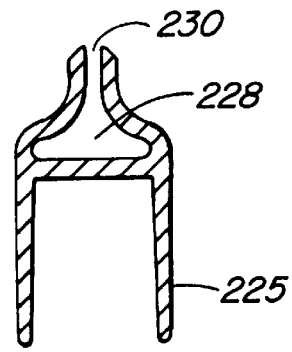
FIG. 33 is a sectional view of the top member of FIG. 32 as seen from section HH.

The bottom member 40 includes a plurality of horizontally extending extension members 60 spaced over the length thereof and a semi-spherical depression 70 in the surface thereof between two adjacent extension members 40. The top surface of extension members 60 is flush with the top surface of the bottom member 40 so that no recess is created in which manure could accumulate. Each extension member 60 includes an overhang member 62 which hooks over and engages a vertically extending support beam 250 (see FIG. 35) secured to the housing substrate by bottom and top members 200,220 of a plurality of support units (see FIGS. 24 and 30). Ribs 78 extending from the surface of the bottom member 40 towards the overhang member 62 act as spacers for establishing a snugger fit of the beam 250. A semi-spherical plug 65 of mating configuration to the depression 70 extends from one of the overhang members 62. Cut-outs 28 are provided in the side members 30 and vertical members 25 for receiving and engaging the top of a beam 250 to support the straight-edge side of panel 10 over the housing substrate.

Figure 10:
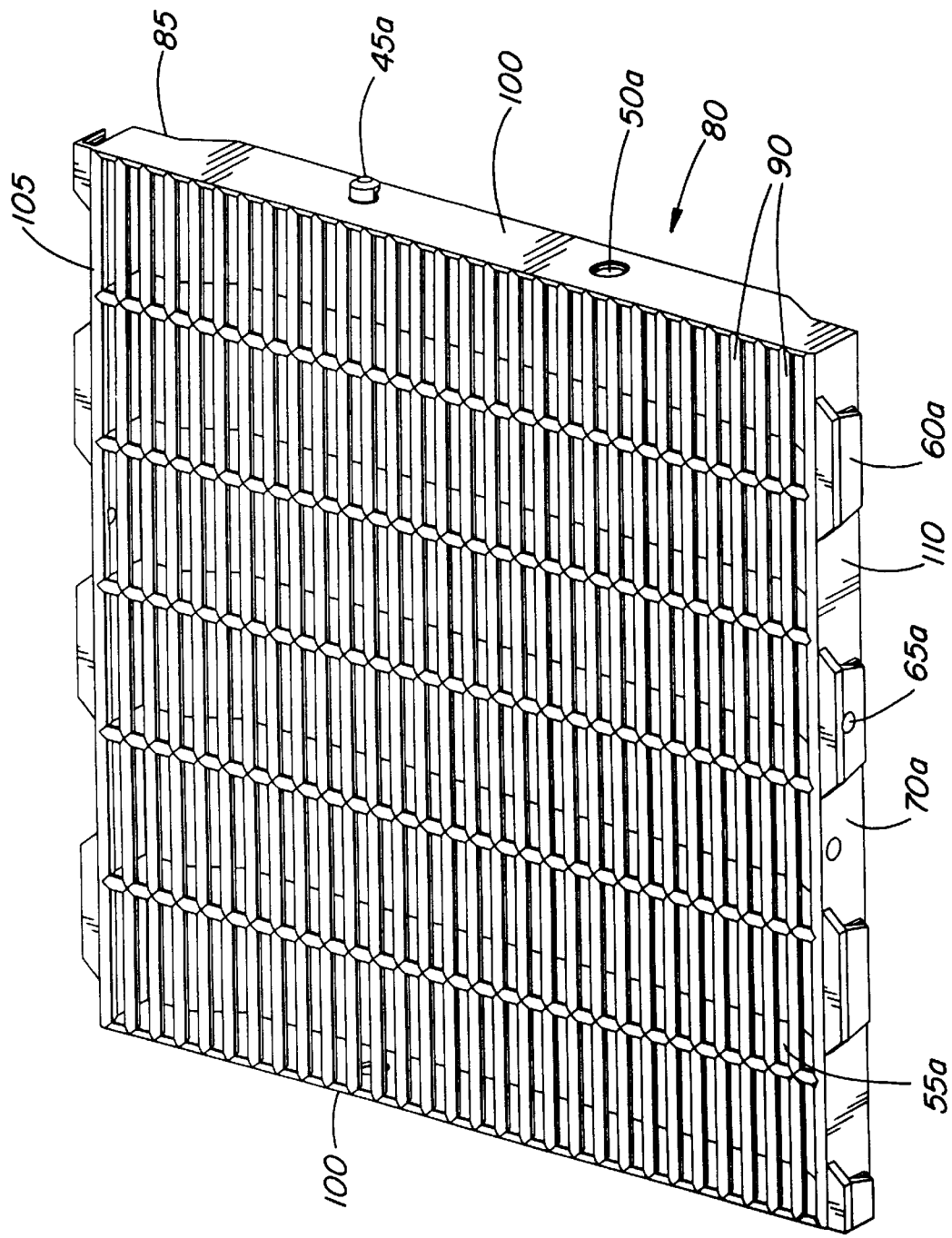
FIG. 10 is a perspective top view of an interior flooring panel in accordance with the invention.
Figure 11:
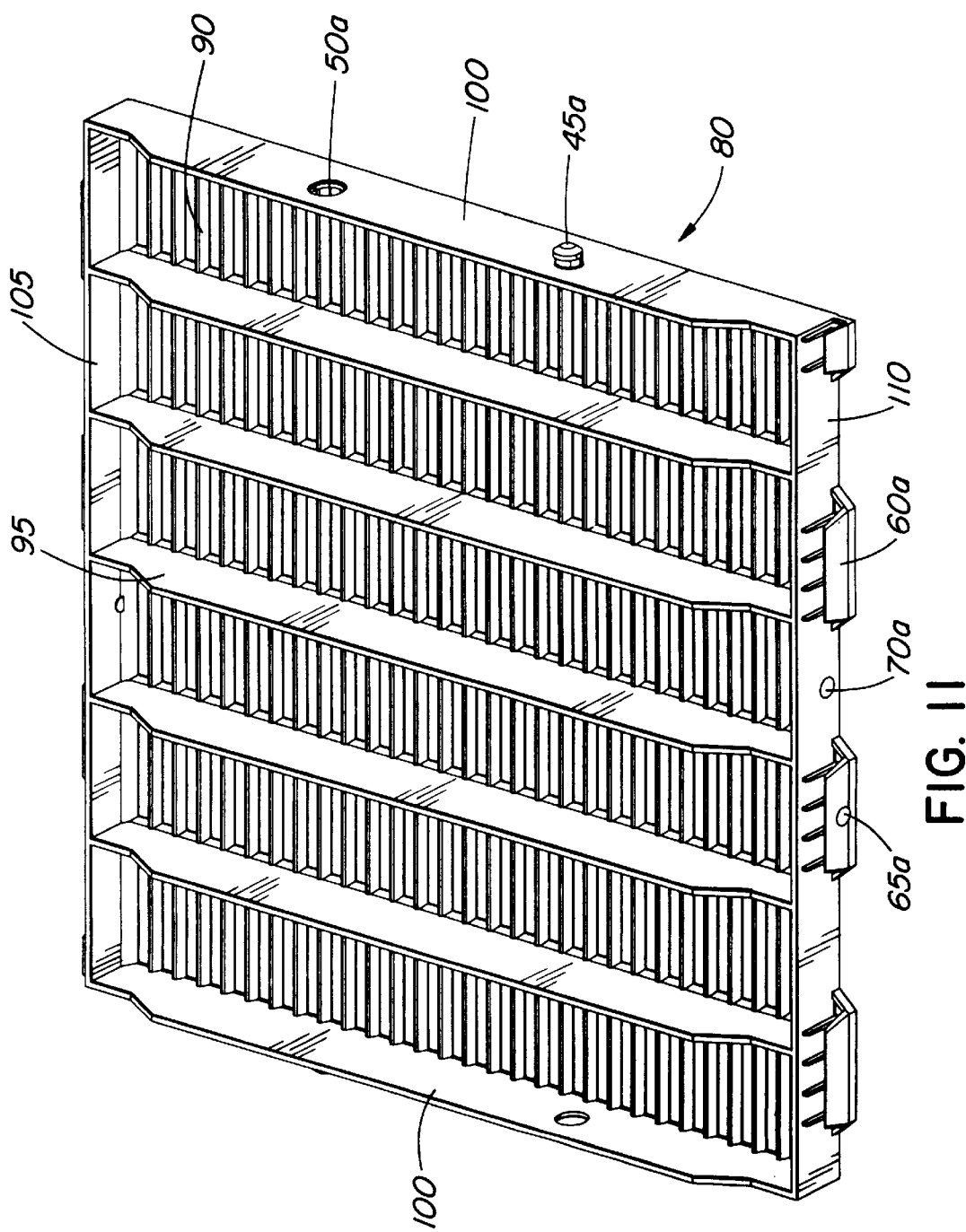
FIG. 11 is a perspective bottom view of the panel of FIG. 10.
Figure 12:
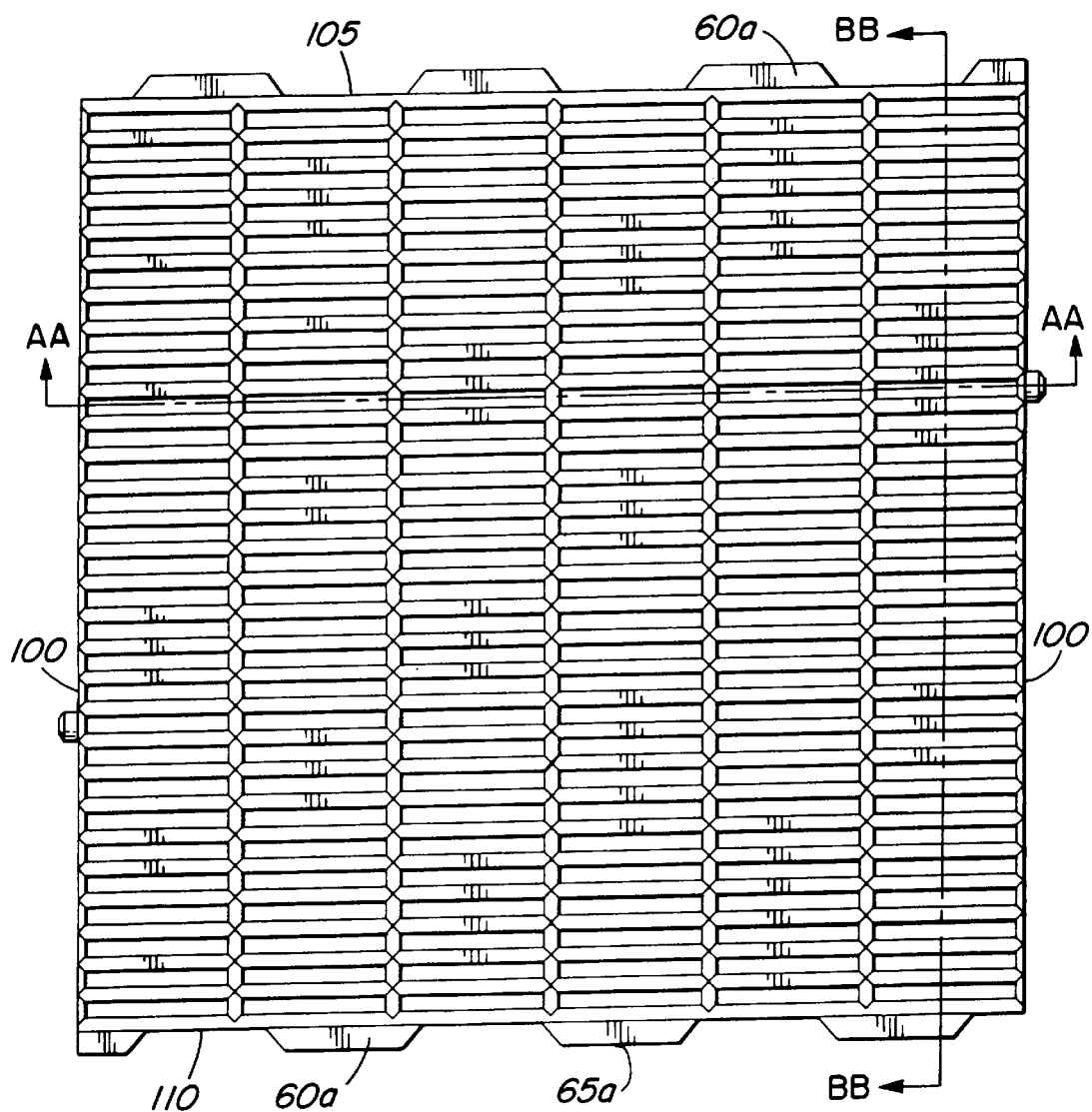
FIG. 12 is a top view of the panel of FIG. 10.
Figure 13:
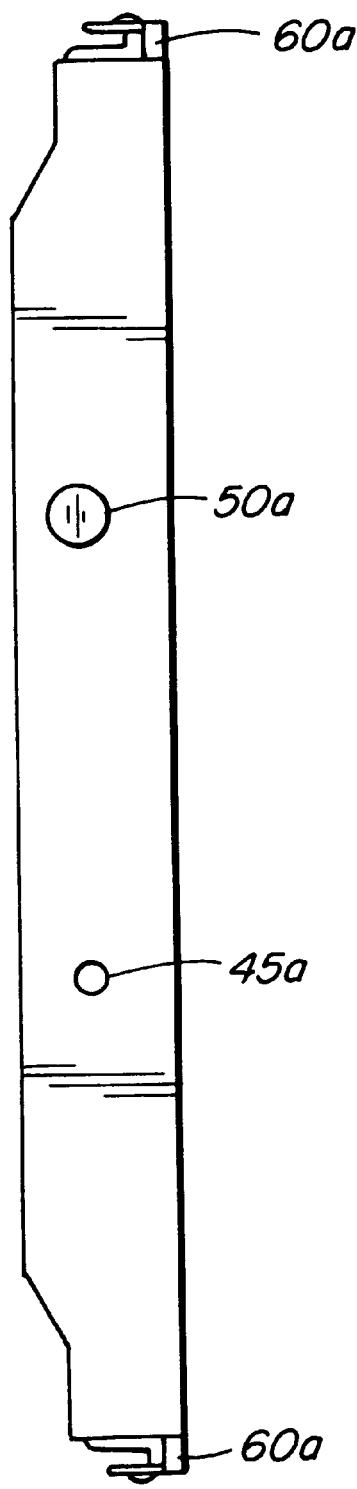
FIG. 13 is a left side view of the panel of FIG. 10.
Figure 14:
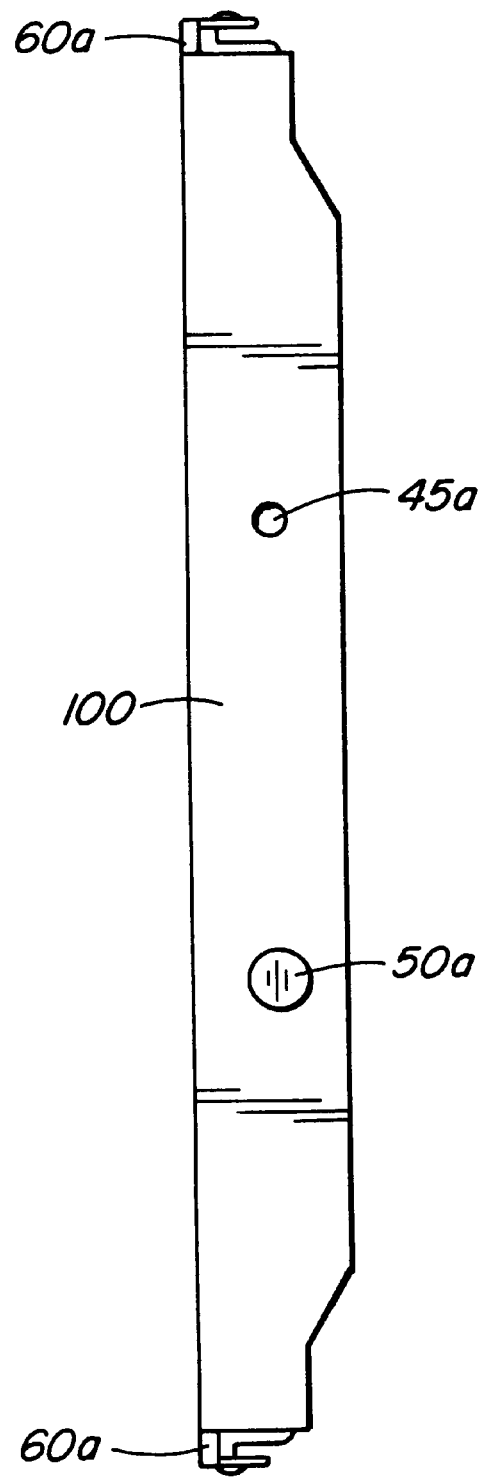
FIG. 14 is a right side view of the panel of FIG. 10 (being identical to and the mirror image of the left side view thereof)
Figure 17:
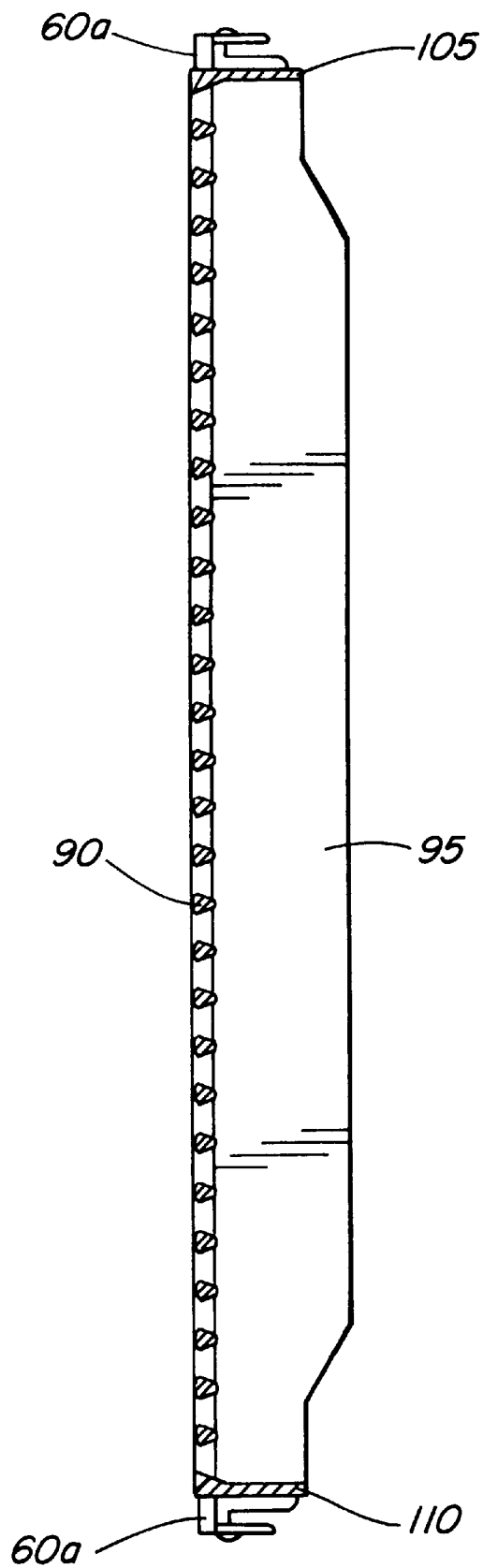
FIG. 17 is a sectional view as seen from section BB—BB of FIG. 12.

FIG. 10 shows a perspective top view of an interior panel 80 and FIG. 11 shows a perspective bottom view thereof.

FIGS. 12–17 illustrate different views of panel 80. The top member 105 of the frame 85 of this panel 80 differs from that of the straight-edge panel 10 in that its configuration is the mirror-image of the bottom member 110 relative to the horizontal center line of the panel. The bottom member 110 is identical to the bottom member 40 of panel 10 and the horizontal members 90 are identical to the like members 20 of panel 10. The side members 100 of this panel are identical to the side members 30 of the straightedge panel 10 except that cut-outs 28 are not provided therein, these being unnecessary because extension members 60a are provided on both the top and bottom members to hook over and engage a support beam 250. Similarly, the vertical members 95 are identical to the vertical members 25 of panel 10 except that cut-outs 28 are not provided therein.

Panels 10,80 have the same outer dimensions. A multitude of suitable dimensions for any given installation could be selected. For the embodiment described herein a width of 24 inches and a length of 24 inches was chosen. Panels 10,80 are preferably comprised of thermoplastic which is sanitary and easy to cut and handle.

The interior panel 80 is rotatable because its side members 100 and top and bottom members 105,110 are configured as mirror images of each other. Accordingly, either one of the top and bottom members 105,110 may be coupled to the top or bottom member 105,110 of another interior panel 80 or to the bottom member 40 of a straight-edge panel 10. This enables one to cut panel 80 to a smaller size to satisfy a need for a smaller dimension in order to fit the panel into a particular space and still make use of the remaining off-cut portion of that panel 80. This is because the off-cut portion of the panel includes a top or bottom member having extension members 60a and, therefore, the off-cut portion can be rotated 180° so as to hook those extension members over an outer support beam. The opposite cut end of the panel is then supported by another support beam by cutting a cut-out 28 into the vertical members 95 of the off-cut portion. The thermoplastic material of the panels 80 is easily cut to provide such cut-outs.

Figure 18:
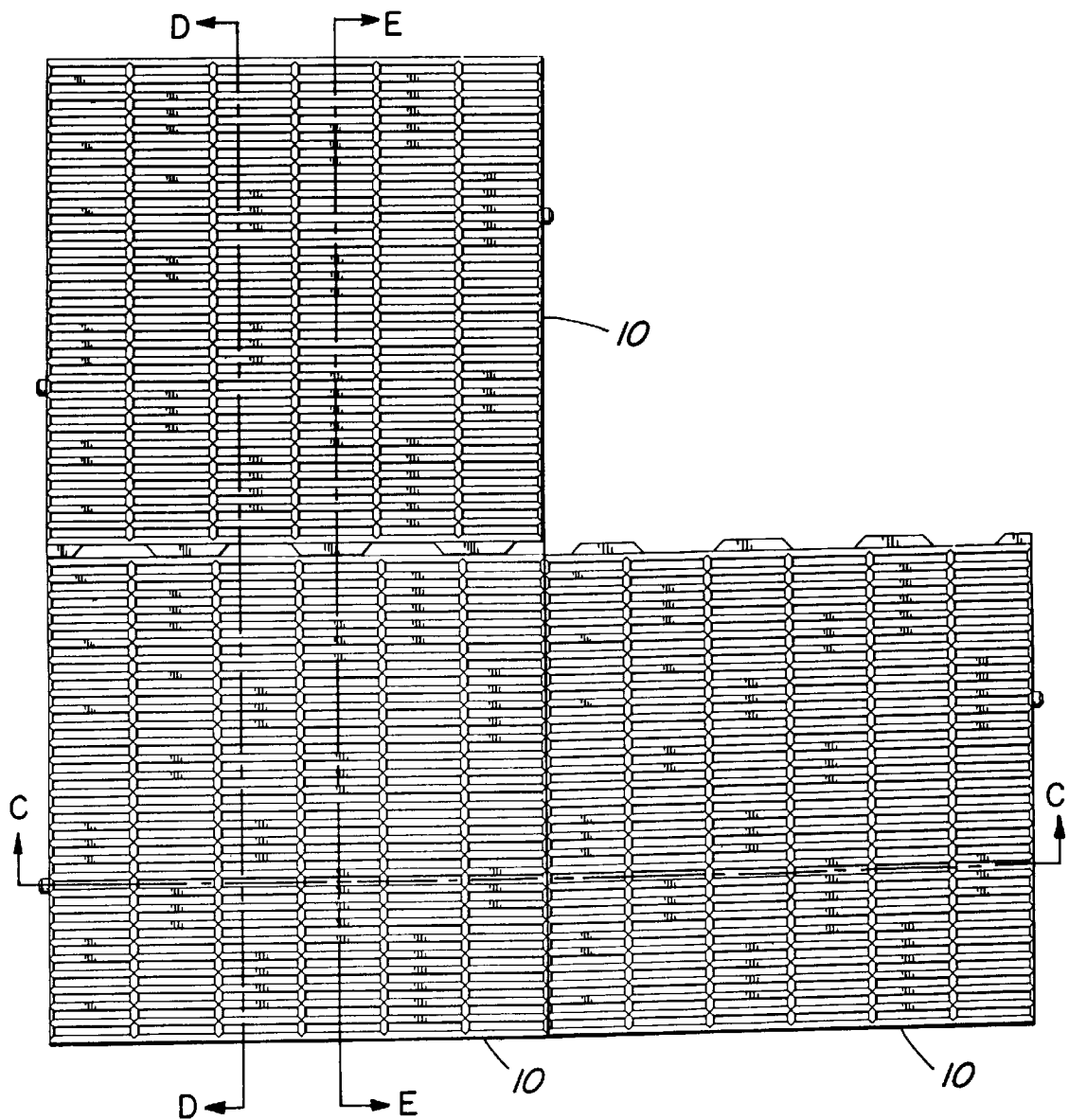
FIG. 18 is a top view of three interconnected straightedge panels (being the panels shown FIG. 1)
Figure 19:
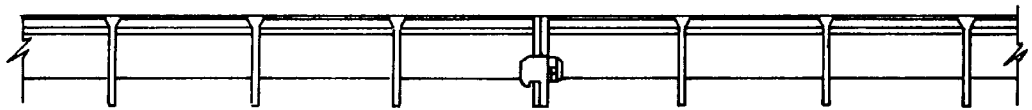
FIG. 19 is a partial sectional view of the interconnected panels of FIG. 18 as seen from section CC.
Figure 20:
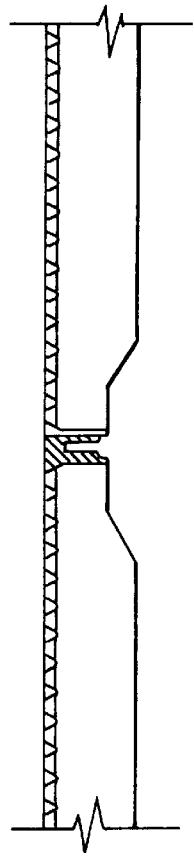
FIG. 20 is a partial sectional view of the interconnected panels of FIG. 18 as seen from section DD.
Figure 21:
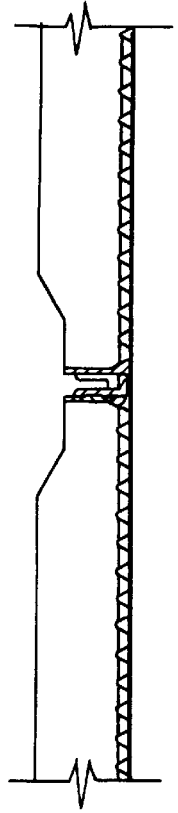
FIG. 21 is a partial sectional view of the interconnected panels of FIG. 18 as seen from section EE.
Figure 22:
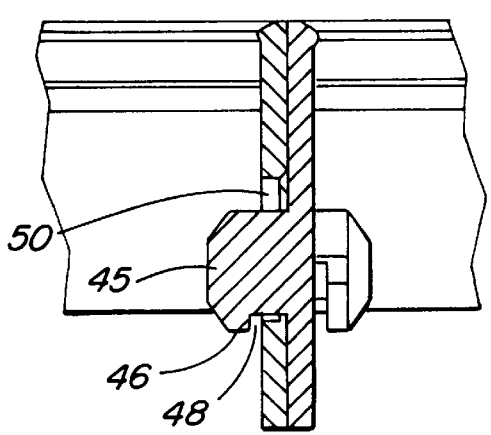
FIG. 22 is an enlarged view of a side member locking arm engaged in an aperture of an adjacent panel.
Figure 23:
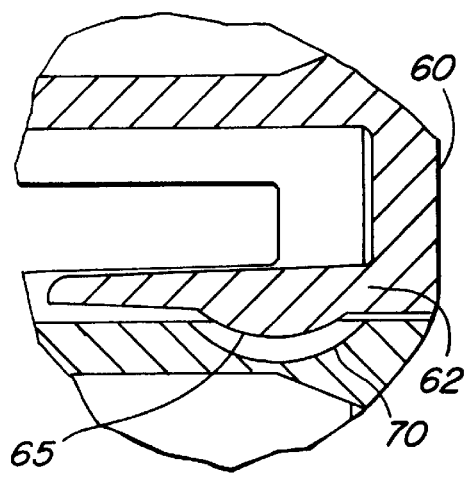
FIG. 23 is an enlarged view of an extension member plug fitted into a depression in a matingly coupled top or bottom member of an adjacent panel.

The panel 10 couples to horizontally adjacent panels 10, and panel 80 couples to horizontally adjacent panels 80, by passing the locking arm 45 of one panel through the aperture 50 of the other panel so as to engage the channel 48 formed between the lip 46 and the end of the arm 45 with the wall of the side member of the other panel as shown by FIGS. 18, 19 and 22. The extension members 60 have a smooth, top surface and upwardly tapering sides to matingly interconnect with the extension members of an adjacent panel whereby the extension members snugly fit together to avoid any significant spaces therebetween. The plug 65 snap fits into the depression 70 of the adjacent panel.

Figure 35:
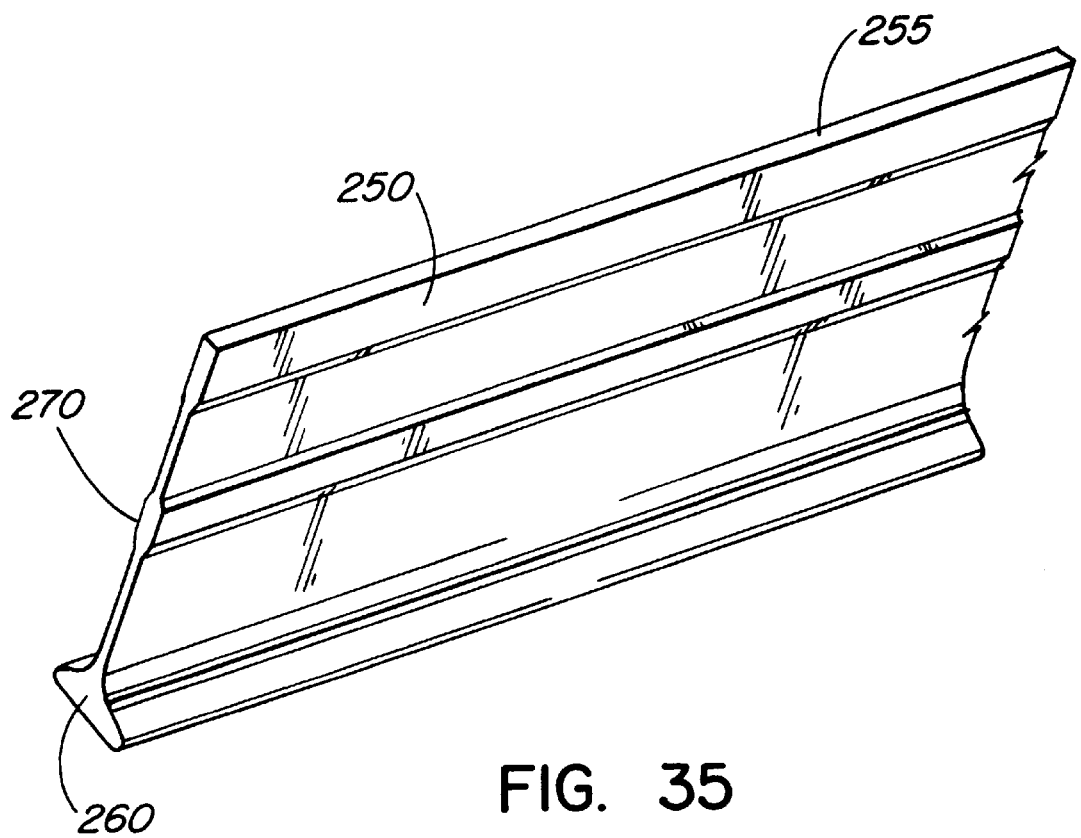
FIG. 35 is a perspective view of a support beam.
Figure 36:
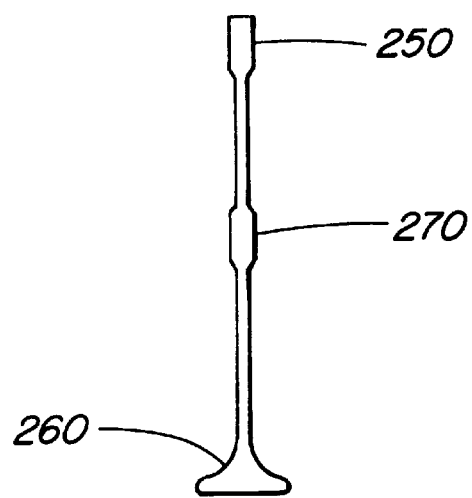
FIG. 36 is an end view of the support beam of FIG. 35.

FIGS. 24–28 illustrate a bottom member 200 of a preferred support unit for the panels 10,80 for the attachment of the panels to a substrate of the housing (i.e. the hard flooring of the building). FIGS. 29–34 illustrate the top member 220 of the support unit. FIGS. 35 and 36 illustrate a support beam 250 of the support unit. A rim 210 of the bottom member 200 is screwed to the substrate and a cylindrical receiving member 215 extends upwardly from the rim 210. The rim 210 includes a straight edge 208 which can be abutted to a wall of the housing (i.e. for supporting a panel adjacent to the wall). This eliminates any space between the support member 200 and the wall into which manure could lodge. The top and bottom members of the support unit are preferably comprised of thermoplastic.

An extension pole (not shown in the drawings) couples the bottom and top support members 200,220. A hollow pole comprised of thermoplastic or a plastic laminate is suitable. One end of the pole snugly slide-fits into the cylindrical receiving member 215 of the bottom member 200 and the cylindrical extension member 225 of the top member 220 snugly slide-fits over the other end of the pole. The ribs lining the interior of members 215,225 (see FIGS. 24 and 29) assist in providing a snug fit between the pole and the bottom and top support members. The extension pole may be of any appropriate length, e.g. 14 inches to 4 feet, depending upon the desired height of the flooring panels 10,80 above the housing substrate.

A longitudinal slot 230 of the top support member 220 snugly receives the lower portion of a support beam 250, the beam 250 having a flared lower portion 260 which fits into the matingly configured bottom portion 228 of slot 230. The beam 250 may be of any appropriate length depending upon the installation with lengths of 12 feet to 20 feet being provided by the inventors. A thicker section 270 of the beam 250 is provided to strengthen the beam longitudinally. The top 255 of the beam 250 is engaged by the extension members 60, 60a of panels 10,80 and the support unit thereby secures panels 10,80 over and to the substrate.

The support members 200,220 and extension poles between are appropriately spaced over the housing substrate for supporting the weight of the animals to be retained by the flooring. For pigs at the nursery stage of growth (up to approximately 35 kg.) the support members are spreed every 7 feet. For heavier animals a lesser spacing would be required.

What is claimed is:

1. Modular flooring apparatus for an animal housing having walls and a substrate, said apparatus comprising:

(a) a plurality of interior flooring panels each comprising a rectangular frame having side, top and bottom members and a plurality of spaced horizontal and vertical members extending between said side and top and bottom members of said frame, respectively, to form a plurality of horizontal slots, each said side member comprising means for coupling said interior panel to an adjacent like panel, said top and bottom members each comprising a plurality of extension member horizontally spaced over the length thereof;

(b) a plurality of straight-edge flooring panels each comprising a rectangular frame having side, top and bottom members and the same outer dimensions as said frames of said interior flooring panels, and a plurality of spaced horizontal and vertical members extending between said side and top and bottom members of said frame, respectively, to form a plurality of horizontal slots, each said side member comprising means for coupling said straightedge panel to an adjacent like panel, said bottom member comprising a plurality of extension members horizontally spaced over the length thereof and said top member being smooth and providing a straight-edge for abutment with a wall of said housing; and, (c) a plurality of panel support units each comprising means for fixing said unit to a substrate of said housing and means for engaging at least one of said interior flooring and straight-edge flooring panels support said at least one panel over said substrate;

said panels being configured for adjacent coupling whereupon said coupling means couples horizontally adjacent panels and said extension members of vertically adjacent panels matingly interconnect, said coupling means and said extension members of said interior panels being configured to render said interior panels fully rotatable to permit each side member of one of said interior panels to couple to either side member of another one of said interior panels positioned horizontally adjacent thereto and each of said top and bottom members thereof to couple to either of said top and bottom members of another one of said interior panels positioned vertically adjacent thereto.

2. Modular flooring apparatus according to claim 1 wherein said coupling means of said side members comprises a locking arm extending from the interior face of said side member and an aperture spaced from said locking arm through the interior of said side member, said locking arm comprising a downwardly extending lip at the end thereof and a channel between the end of said arm and said lip whereby said channel of a locking arm of a first panel engages the wall of the side member of an adjacent panel and resists upward movement of said adjacent panel relative to said first panel when said locking arm of said first panel has passed through and engaged with the aperture of said adjacent panel.

3. Modular flooring apparatus according to claim 2 wherein said top and bottom members of said interior panels and said bottom members of said straight-edge panels comprise a depression in the interior face thereof and one extension member of said top and bottom members of said interior panels and said bottom members of said straight-edge panels comprises a plug configured for snap-fitting into said depression of an adjacent flooring panel when said extension members of vertically adjacent panels matingly interconnect, the outer configuration of said top and bottom members of said interior panels being mirror images.

4. Modular flooring apparatus according to claim 3 wherein said extension members comprise a smooth top surface whereby the top surface of the area surrounding the interconnecting edges of adjacent vertical panels is smooth, continuous and without any visual space between the edges of the interconnected extension members of the adjacent panels.

5. Modular flooring apparatus according to claim 4 wherein said horizontal members of said panels are generally triangular in cross-section.

6. Modular flooring apparatus according to claim 5 wherein said panels are comprised of thermoplastic.

7. Modular flooring apparatus according to claim 6 wherein the shape of said panels is square.

8. Modular flooring apparatus according to claim 6 wherein said panel support unit comprises a bottom support member for attachment to said substrate, a top support member, an extension pole extending between and coupled to said bottom and top support members and a longitudinal beam secured by said top support member, wherein said top support member matingly interconnects with a bottom portion of said beam.

9. Modular flooring apparatus according to claim 8 wherein said bottom support member comprises a straight edge for abutment to a wall of said housing.

10. Modular flooring apparatus according to claim 3 wherein said panel support unit comprises a bottom support member for attachment to said substrate, a top support member, an extension pole extending between and coupled to said bottom and top support members and a longitudinal beam secured by said top support member, wherein said top support member matingly interconnects with a bottom portion of said beam.

11. Modular flooring apparatus according to claim 10 wherein said bottom support member comprises a straight edge for abutment to a wall of said housing.

* * * * *